United States Patent [19]

Loblein

[11] Patent Number: 5,013,102

[45] Date of Patent: May 7, 1991

[54] TRASH ORGANIZER

[76] Inventor: Eldon Loblein, 6 Jackson Ave., Belfast, Me. 04915

[21] Appl. No.: 472,760

[22] Filed: Jan. 31, 1990

[51] Int. Cl.⁵ .............................................. A47B 88/00
[52] U.S. Cl. ................................ 312/234.1; 312/319; 312/305
[58] Field of Search ..................... 312/234, 234.1, 305, 312/319

[56] References Cited

U.S. PATENT DOCUMENTS

| 568,631 | 9/1896 | Smith | 312/305 X |
| 1,436,026 | 11/1922 | Ferge et al. | 312/305 X |
| 1,559,705 | 11/1925 | Jackson | 312/305 X |

Primary Examiner—Joseph Falk
Attorney, Agent, or Firm—Fish & Richardson

[57] ABSTRACT

An under-counter kitchen trash appliance that facilitates sorting of household waste for recycling. Six triangular waste cans are nested in a cylindrical array on a revolving base and enclosed in an independent housing beneath a new or existing kitchen counter, much like a dishwasher. The counter has a trash drop hole above the revolvable nest of cans. The hole is covered by a hinged top. A visible index gauge, indicates the rotated positions of the cans.

5 Claims, 4 Drawing Sheets

TRASH ORGANIZER

BACKGROUND OF THE INVENTION

My invention relates to trash collection and disposal facilities. More particularly it provides a novel apparatus for mounting beneath a kitchen countertop for receiving and classifying for purposes of recycling different types of trash through an opening in the top. It provides a convenient means for segregating and collecting the trash by pre-sorted categories for recycling purposes.

SUMMARY OF THE INVENTION

In accordance with the invention there is provided, in combination with a countertop of a domestic kitchen or the like, a trash collector and organizer, some times herein called "the Recycler." It comprises a revolvable base adapted to support a circular nest of generally triangularly shaped open top trash cans and a mount for the base adapted to hold the same at a predetermined level and location beneath the countertop. The countertop is provided with a trash receiving drop hole at a preselected location above the tops of the open cans. A top cover, hinged to the countertop, is adapted to conceal the drop hole when closed and to expose the drop hole to receive trash when open. Mechanism is provided for revolving the base so as selectively to locate the open mouth of any individual can directly beneath the drop hole.

Indexing means, actuated by the revolving movement of the base, assists in the selection of the cans, such indexing means comprising a visible rotatable gauge bearing indicia and a drive from the revolving mechanism for rotating the gauge. The revolving mechanism has a pedal-controlled drive motor for revolving the can supporting base to selected rotated positions while simultaneously actuating the indexing means.

A door, when open, facilitates the removal of individual cans from the base from the front beneath the counter and, when closed, serves to conceal the collector and organizer from view.

In preferred embodiments, the gauge is located beneath a clear plastic cover flush with the countertop adjacent the drop hole and is mounted at the top of a index drive shaft actuated by the drive motor in synchronization with the revolving base, its indicia being visible through the clear plastic cover; each of the trash cans is provided with a handle on its side to facilitate its manual removal from and replacement on the base through the door; at least one of the trash cans is different in size than the others for the collection of larger or smaller categories of waste materials; and gauge carries on its surface different designs to indicate different types of trash, the clear plastic cover being provided with a visible mark to facilitate aligning the desired can with the drop hole.

Still further objects, features and advantages of the invention will become apparent from the following detailed description of a presently preferred embodiment taken in conjunction with the accompanying drawings.

DETAILED DESCRIPTION OF PREFERRED EMBODIMENT

Figure 1:
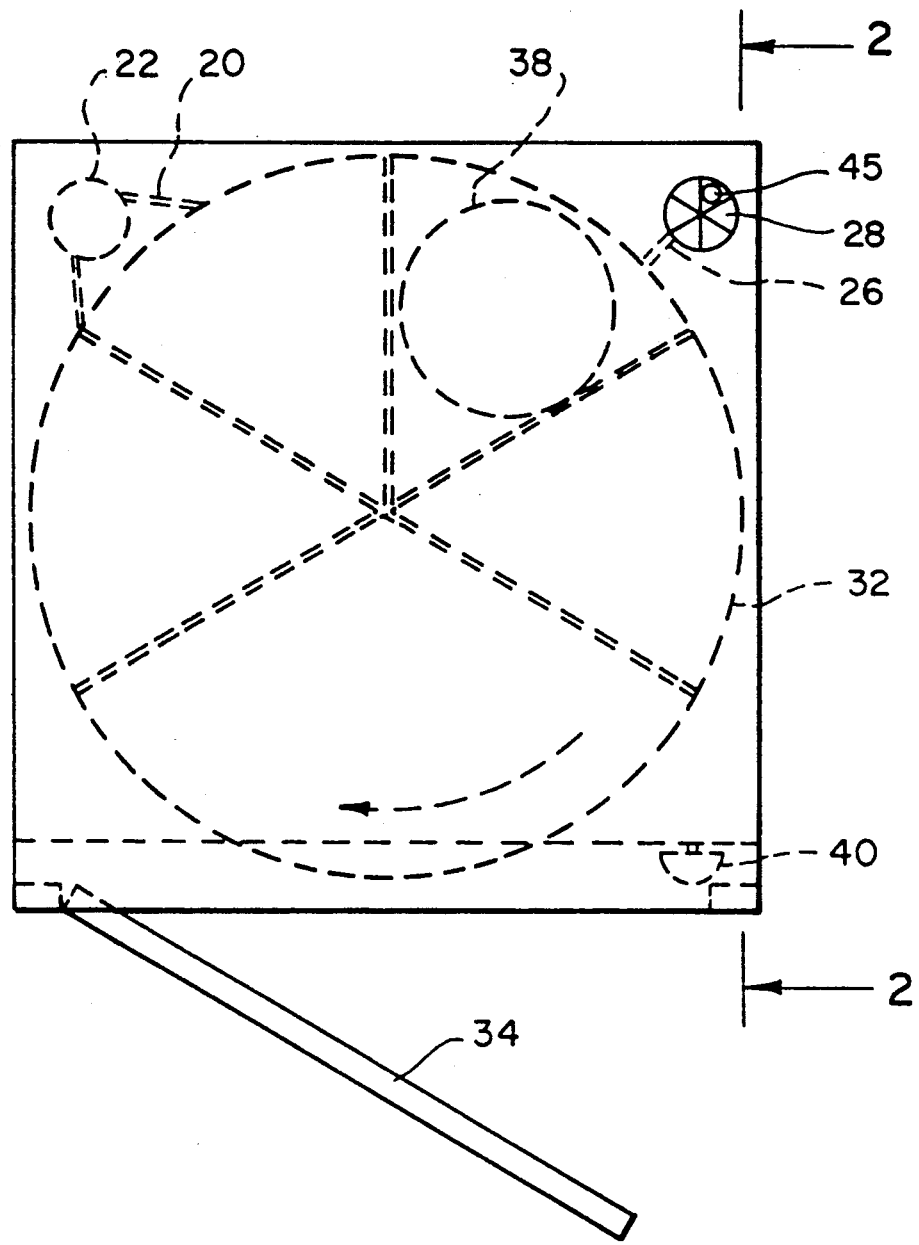
FIG. 1 is a horizontal cross-sectional view of the device taken on line 1—1 of FIG. 2 with the door swung to open position.

The apparatus of the invention, i.e. the Recycler, is adapted to be mounted beneath the typical countertop 10 of a household kitchen. A circular base 12 is revolvably mounted on ball bearings 14 on support 16 through which passes vertical main drive shaft 18. The base is revolved by main belt drive 20 driven by indexing motor 22. The motor is also coupled to an index drive shaft 24 through index drive belt 26. The latter shaft drives the circular index gauge disc 28 to selected rotated positions.

Nested on the base 12 are triangularly shaped trash cans 32 which interfit to form a cylindrical array. The cans may be of a desired number and size so that different types of trash may be dropped individually into selected cans for recycling. As shown, separate cans for plastic, metal, glass, organic material and paper (the last being larger than the others) are provided. The door 34 operated by door handle 35 provides access to whichever can is located at the moment opposite the door opening. Each can has a trash can handle 36 for grasping to facilitate selective individual removal from the array.

A trash drop hole 38 is provided in the counter top 10. The hole 38 is covered by a hinged top 30 when not in use. As explained below, indexing means are visible at all times to indicate to the user the can positions.

In order to rotate the cans to desired positions beneath the trash drop hole 38, the indexing motor 22 may be activated by stepping on pedal 40 which controls switch box 42 energizing line 43 causing motor 22 to revolve base 12 until the desired open can is positioned below the trash drop hole 38.

Figure 2:
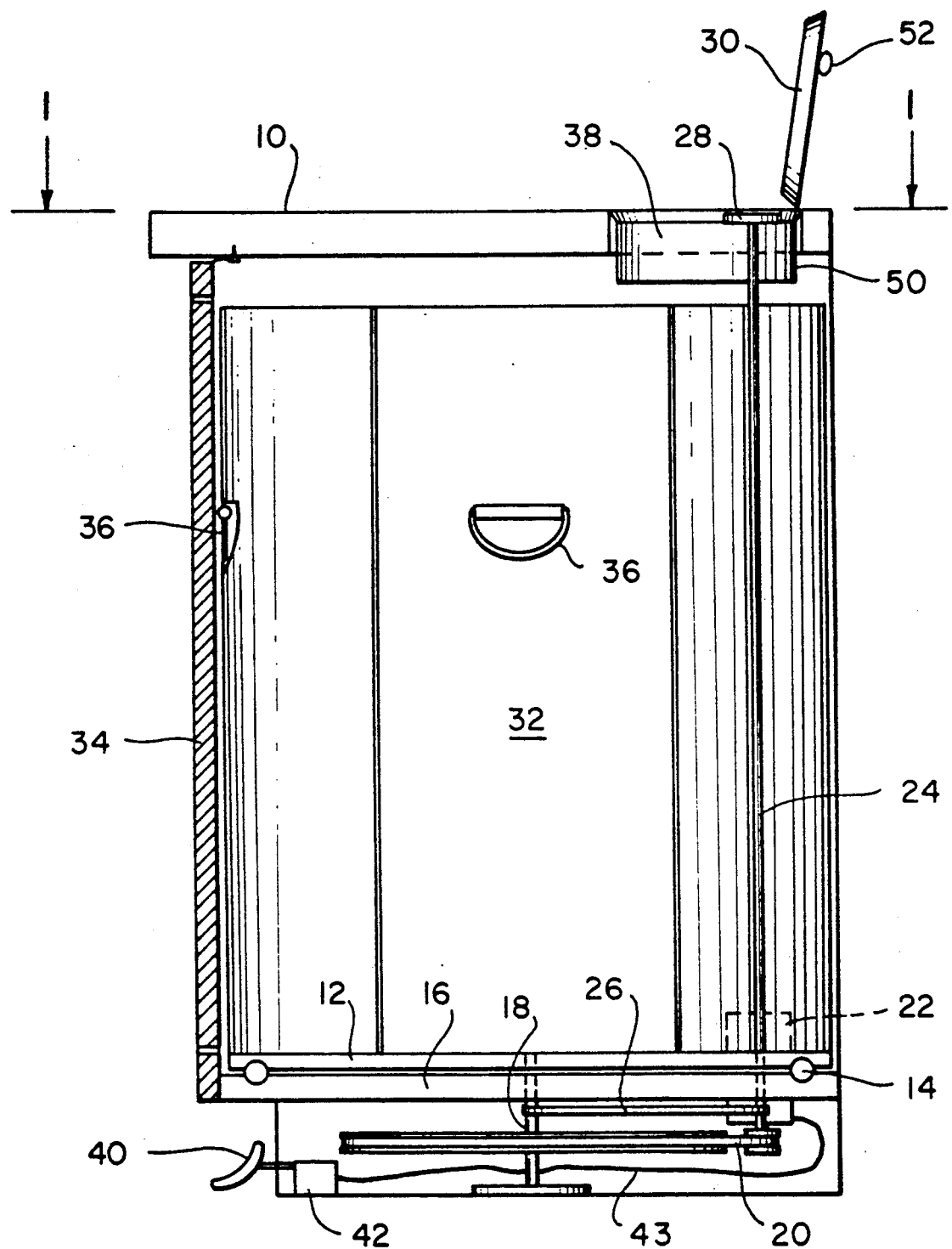
FIG. 2 is a vertical sectional view taken on line 2—2 of FIG. 1 with the door closed.
Figure 3:
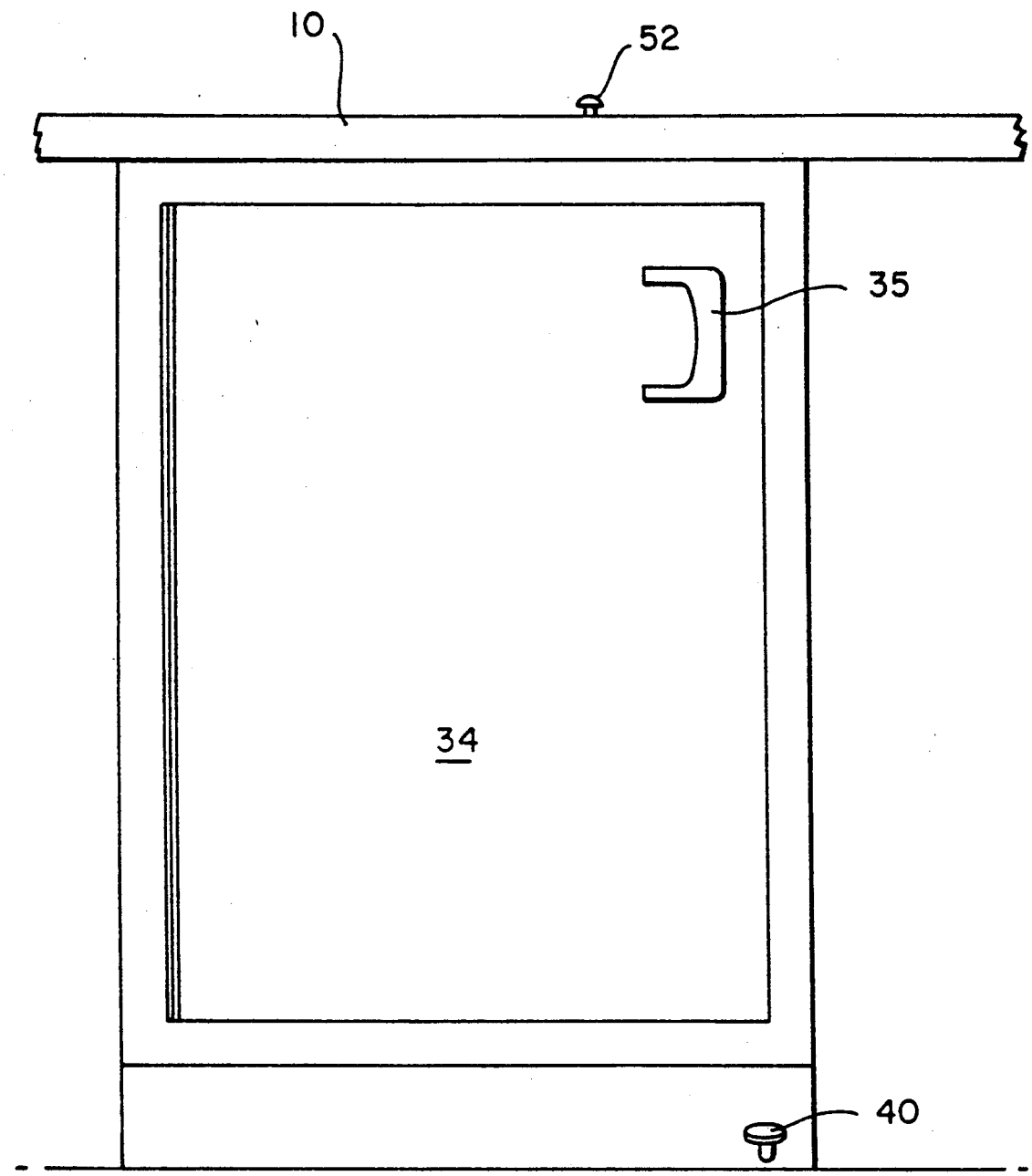
FIG. 3 is a front view with the door closed.
Figure 4:
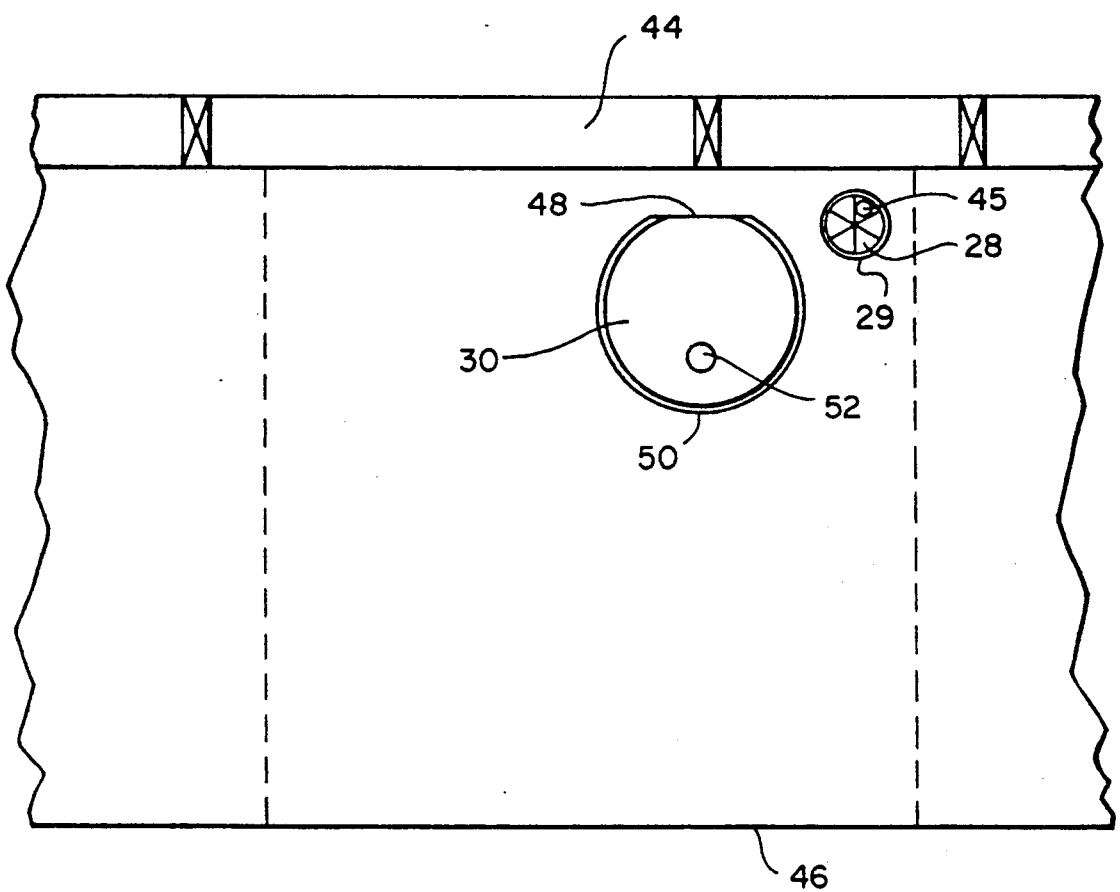
FIG. 4 a top view of the portion of the kitchen countertop which covers the trash organizer of the invention.

The entire apparatus is concealed in the kitchen counter volume between wall 44 and front edge 46 (FIG. 4). The drop top 30 is hinged at 48 to close against a collar 50 (FIG. 2). The drop top may be manually swung between its open and closed positions by grasping knob 52.

Turning to the indexing means for indicating to the user the rotative positions of the cans, a clear plastic cover 29 is mounted flush with the countertop above the rotatable gauge disc 28 so as to reveal the indicia marked on its upper surface. A black circle on the cover may represent the drop hole 38 in the countertop 10. Viewed through this cover can be seen six triangular emblems on a revolving circular display on the surface of the disc 28 representing the different trash categories. A pictorial display of a bottle (for glass), a can (for metal), a newspaper, a sandwich, etc. could be used simply to identify each category. As the nested cans are revolved by the mechanism described, successive pictures appear beneath the black circle 45 on the plastic gauge top. When the desired picture is aligned with the circle, revolving motion of the base 12 is halted by releasing the foot pedal 40. Trash of the desired category may now be dropped through the hole 38 in the countertop, thus leaving the user's hands free to prepare food, cook, or clean, etc.

Thus, it will be seen that trash is dropped through a hole 38 made in the countertop 10. By depressing foot pedal 40 the mechanism is revolved and by releasing the foot pedal a particular waste can 32 may be positioned beneath the hole 38 through which trash is then dropped. Thus, the Recycler is adapted to separate in this way up to six common categories of waste (organic, paper, plastic, glass, metal and chemical). The individual cans 32 may be removed by hand through a door 34 on the front of the kitchen counter and emptied into larger storage cans awaiting pickup by a municipality. A double-size can and a half-size may be provided the recycler to accommodate larger or smaller waste categories. The cans 32 preferably should be of light weight, durable plastic.

OPTIONAL FEATURES

A larger self-contained island model measuring 36" square could increase the capacity and number of different trash categories while providing additional work space in the kitchen. A chopping-block or DuPont Corian ® type top would be attractive and durable.

A standard size can made smaller with a false bottom would be useful in the storage of organic waste by requiring more frequent removal and emptying, thus minimizing odors from decay.

Optional rubber seals (not shown) surrounding front door 34 and trash drop lid 30 also would aid in containing odor and prevent insects from becoming a problem. A vent pipe connected to the kitchen's sink drain is also a desirable optional feature.

While there has herein been disclosed and described a presently preferred embodiment of the invention, it will nevertheless be understood that the same is by way of illustration and not by way of limitation and it is intended that the scope of the invention be limited only by the proper interpretation to be accorded the appended claims.

I claim:

1. In combination with a countertop of a domestic kitchen or the like, a trash collector and organizer to facilitate recycling which comprises
    a revolvable base adapted to support a circular nest of generally triangularly shaped open top trash cans,
    a mount for said base holding the same at a predetermined level and location beneath the countertop,
    said countertop having a trash drop hole at a preselected location above said open cans,
    a top cover hinged to the countertop adapted to conceal said drop hole when closed and to expose said drop hole to receive trash when open,
    mechanism for revolving said base so as selectively to locate the open mouth of any individual can directly beneath said drop hole,
    indexing means actuated by the revolving movement of said base to assist in the selection of the cans, said indexing means comprising
    a rotatable indicia bearing gauge and
    a drive from said revolving mechanism for rotating said gauge,
    said revolving mechanism having a pedal-controlled drive motor for revolving the can supporting base to selected rotated positions while simultaneously actuating said indexing means, and
    a door which, when open, facilitates the removal of individual cans from said base from the front beneath the counter and which, when closed, serves to conceal the collector and organizer from view.

2. The combination as claimed in claim 1 wherein said gauge is located beneath a clear plastic cover flush with the countertop adjacent said drop hole and mounted at the top of an index drive shaft actuated by said drive motor in synchronization with said revolving base, its indicia being visible through said clear plastic cover.

3. The combination as claimed in claim 1 wherein each of said trash cans is provided with a handle on its side to facilitate its manual removal from and replacement on said base through said door.

4. The combination as claimed in claim 1 wherein at least one of said trash cans is different in size than the others for the collection of larger or smaller categories of waste materials.

5. The combination as claimed in claim 2 wherein said gauge carries on its surface different designs to indicate different types of trash an-d said clear plastic cover is provided with a visible mark to facilitate aligning the desired can with the drop hole.

* * * * *